Dec. 26, 1961   L. J. ENGLUND   3,014,271
TOOL FOR REMOVING SEALS
Filed July 18, 1957
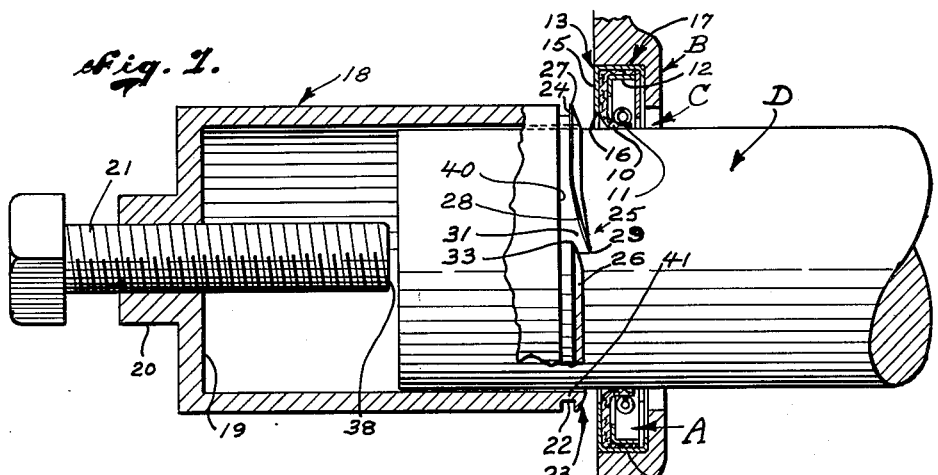
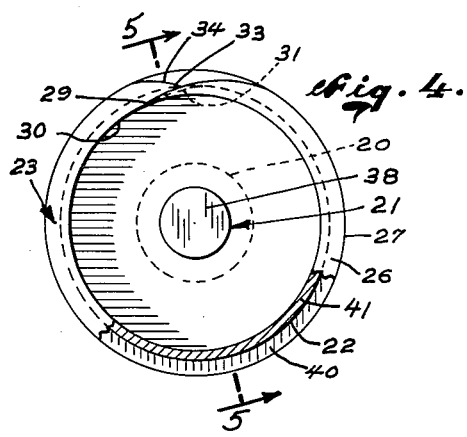
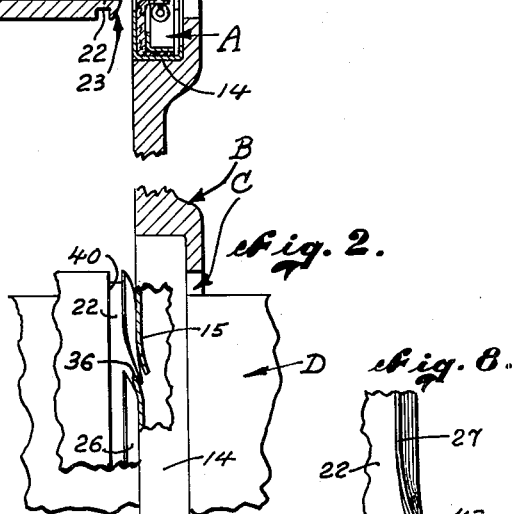
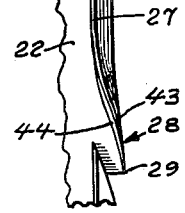
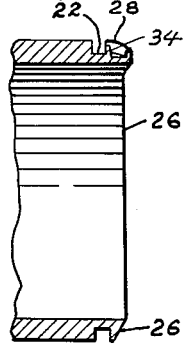
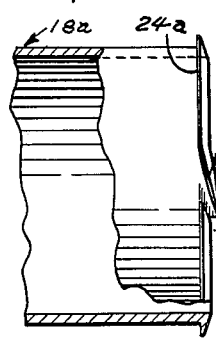
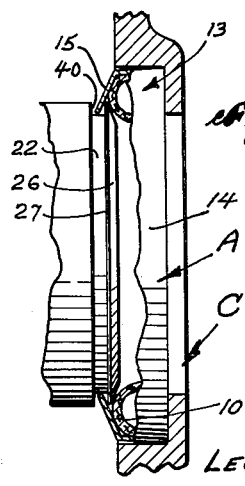
INVENTOR.
LEONARD J. ENGLUND
BY
Albert Latta
ATTORNEY

United States Patent Office 3,014,271
Patented Dec. 26, 1961

3,014,271
TOOL FOR REMOVING SEALS
Leonard J. Englund, 7929 26th Ave., Kenosha, Wis.
Filed July 18, 1957, Ser. No. 672,826
5 Claims. (Cl. 29—263)

The invention relates to a seal removing tool having particular utility where there is a minimum clearance between the seal flange and attendant shaft and the principal object is to provide such a tool for facilitating seal removal.

A specific object is to provide a seal removing tool which effects contraction of the seal outside diameter during application of axial tension on the seal, thereby facilitating seal removal.

Other objects and advantages of the invention will be apparent from the ensuing specification and appended drawing in which:

FIG. 1 is a fragmentary sectional view of the seal removing tool showing a typical seal-over-shaft arrangement;

FIG. 2 is a fragmentary detail view showing the tool breaking the seal flange;

FIG. 3 is a fragmentary view, partly in section, showing the tool and seal flange during the act of removing the seal;

FIG. 4 is a front end view of the tool shown partly in section;

FIG. 5 is a fragmentary sectional detail view taken on the line 5—5 of FIG. 4;

FIG. 6 is a fragmentary side elevational view of a modified form of the invention;

FIG. 7 is a fragmentary front view of the tool shown in FIG. 6; and

FIG. 8 is an enlarged detail view of a portion of the tool.

Referring to FIG. 1 I have shown a typical seal-over-shaft arrangement wherein a seal identified generally by the letter A is pressed into an annular recess formed in a stationary housing wall B, such housing having an opening C through which the shaft D projects.

It will be understood that the shaft has a cylindrical outer wall and the seal is generally of circular shape encircling the shaft.

The seal assembly includes an annular flexible sealing member 10 radially pressurized against the outer wall of the shaft as by means of an annular coil spring 11 so as to prevent escape of lubricant along the shaft.

The sealing member 10 is held between the inner and outer annular rings 12 and 13 respectively.

The outer ring may include the circular wall portion 14 and a radially inwardly turned annular flange portion 15 having an axial opening therethrough through which the shaft projects.

The perimeter 16 of the flange opening, of course, encircles the shaft and is usually spaced only a slight distance from the outer surface of the shaft. In a typical seal assembly the annular backing flange 15 is normally formed of a thin walled material which can be easily mutilated when one attempts to remove the seal assembly from the annular recess 17 in which the seal assembly is pressed fitted.

My seal removing tool may include a cylindrical shell portion 18 with an end wall 19 having an internally threaded hub 20 into which the screw 21 is threaded. The internal diameter of the shell is, of course, large enough to slide over the shaft D. At the forward end of the shell an annular groove 22 is formed in and encircles the outer wall of the shell. A circular flange 23 is formed at the forward end of the shell and the rear wall 24 of such flange forms the forward wall of the annular groove 22. It will be noted that the rear wall of such flange lies in a common diametric plane which is substantially at right angles to the axis of the shell. The only portion of such flange wall which does not lie in such diametric plane is that portion which migrates forwardly to form the leading edge, identified generally by the numeral 25.

The forward wall 26 of such flange is preferably rather steeply inclined and the outer most circumferential edge 27 of such flange is preferably quite narrow and approaches knife-like characteristics. The steep inclination of the forward wall of the flange serves to cut down the extent of entry into the seal opening and also to cause the flange to feed in between the inner wall of the seal flange and the flexible seal member 10 as best shown in FIG. 3.

That portion of the flange which is identified as the leading edge has its crest portion 28 formed as a generally knife-like edge with a progressively diminishing radial dimension and terminating at 29 substantially flush with the internal wall 30 of the shell. The flange edge 28 migrates forwardly at an angle of a few degrees with reference to the diametric plane of the rear wall 24 of the remaining portion of the flange and immediately behind such flange edge 28 an entrance ramp 31 is formed, such ramp commencing at the zero dimension 29 and increasing progressively in radial dimension (but at a lesser rate than the cutting edge 28) until such ramp portion merges with the base portion 22 of the annular groove. The flange terminates at 33 with a progressively diametrically reduced trailing edge 34 providing a gap in the continuity of the flange edge so that the ramp portion 31 leads unobstructedly into the annular groove 22.

The flange portion of the shell, particularly the leading edge portion 25 thereof, is hardened sufficiently as to permit breaking or cutting of the seal flange 15 without damaging the cutting edge 28 to any appreciable extent. Such hardening will substantially obviate the necessity of resharpening of the cutting edge 28. It will be noted that the outermost circumferential edge 27 of the flange is larger in diameter than the internal diameter of the seal flange opening 16 and that the cutting edge 28 of the flange which commences flush with the internal diameter of the shell is lesser in radial extent than the radial dimension of the flange opening 16 (that is, at some point along the length of the cutting edge 28 commencing from the terminus 29 the radial extent of such cutting edge is less than the radial extent of the seal flange opening).

*The method of using the tool*

The flange end of the shell is first guided onto the shaft D and moved axially thereof toward the seal assembly A and any position of rotation of the shell from the shaft is satisfactory at the time when the cutting edge 28 is brought into initial contact with the seal flange 15. The innermost end 29 of the cutting edge enters beneath the flange 15 into the opening 16 until the cutting edge 28 makes contact with the seal flange. Then an axial thrust on the shell (preferably a rather sudden thrust somewhat approaching a blow) is exerted causing the cutting edge 28 to cut through or break through the perimeter of the seal flange, as indicated in FIG. 2. After penetration of the seal flange is made, then the shell is forcibly rotated (counter-clockwise viewing FIG. 4) and the leading end 36 of the seal flange is fed into the annular groove 22 behind the flange 23. Continued rotation of the shell causes the entire circumferential extent of the seal flange to be fed into a position behind the flange 23. It will be noted that the diameter of the base portion 22 of the annular groove is about the same as or slightly less than the internal diameter of the seal flange opening so that no radial outward pressure is exerted on such seal flange while being fed into groove 22. It should also be pointed out that in excess of 300 degrees of the seal flange is in contact with the rear wall 24 of the tool flange for reasons to be explained hereinafter.

The next step is to apply axial tension on the seal assembly by rotating the screw 21 until the inner end 38 thereof engages the end of the shaft D whereupon continued rotation of such screw causes the rear wall 24 of the tool flange to exert an axial thrust on the seal flange. In view of the fact that substantially the entire circumferential extent of the rear wall 24 of the flange lies in a common diametric plane, an equal axial thrust is exerted on the seal flange at any given location throughout nearly all of its circumferential extent. Continued rotation of the screw 21 causes the seal flange 15 to commence to bow outwardly in the manner as indicated in FIG. 3 thereby causing a slight contraction of the outside diameter of the base portion 17 of the seal flange and thereby facilitating withdrawal of the seal assembly from the housing recess 17.

In some instances the seal flange may tend to continue to bow outwardly beyond the extent as indicated in FIG. 3, whereupon any excessive bowing is preventing by the inner wall 40 of the annular groove, such wall serving to lock the seal flange within the annular groove and assuring removal of the seal assembly from the housing recess 17.

In view of the fact that the rear wall 24 of the tool flange exerts equal axial pressure throughout substantially the entire circumferential extent of the seal flange, the weakness of the seal flange, due to its being comparatively thin, does not prevent successful operation of my tool in removing the seal assembly from the housing recess. Due to the progressively decreasing radial extent of the cutting edge 28, it does not matter how close the perimeter 16 of the seal flange is situated relative to the outer surface of the shaft D. Such clearance, for example, could be as little as 1/16 of an inch, the wall thickness at 41 of the tool in such case being slightly less than 1/16 of an inch.

Referring to FIG. 6 it will be noted that instead of an annular groove 22 the outer diameter of the shell is constant throughout its length from the rear wall 24a of the flange 23. It has been found that this type of construction is suitable for removal of most types of seal assemblies, the locking feature provided by the inner wall 40 of the form of tool as shown in FIGURES 1 through 5 of the drawing being omitted.

Referring to FIG. 7 it will be noted that the leading edge 25a in conjunction with the trailing edge 34a defines a generally straight line effect when viewed head on as in FIG. 7, the progressive radial increase of each edge being at a lesser rate than as shown in FIG. 4. With this type of construction it will be assured that a portion of the leading edge 25a will make sufficient entry beneath the seal flange so that it will usually not be necessary to apply axial pressure on the tool shell 18a in order to break the seal flange. Rather, it is only necessary to commence rotating the shell and the breaking of the seal flange will be effected as the leading edge is fed further into the seal opening.

While I have shown a threaded bolt 21 coacting with shell 18 as the means for applying the axial withdrawal pressure, it will be understood that other means could be employed for accomplishing this function. Also, the end wall 19 could be in the form of an insert secured at the end of the shell. Likewise, the forward portion of the tool might be fabricated separately from the shell and then secured to the shell—such forward portion, for example, could be a forging and the shell made of standard tubing stock.

I have found that by utilizing my tool a seal can usually be removed from its retainer in a matter of minutes, where as the prior art methods now in use entail several hours of tedious labor due to the inaccessability of a seal having a shaft projecting therethrough.

Referring to FIG. 8 I have shown an enlarged detail view of the leading edge wherein it will be noted that the crest portion 27 of the flange crosses over from the rear face to the forward face at 43 and then continues to the terminus 29. Thus a minimum entry of the leading edge into the seal opening occurs at the moment the seal flange is severed and such severance is effected with a minimum of effort. The inclined rear wall (formed as a result of the crossing over of the cutting edge 28) facilitates the feeding of the lead end 36 of the seal flange behind the tool flange, as shown in FIG. 2.

I claim:

1. A tool for removing a seal having an end wall with an opening therein and wherein a shaft protrudes through such seal wall opening, said tool comprising a hollow and substantially non-expansible shank adapted for telescopic guidance on the shaft; a substantially rigid flange circumscribing a major portion of the external circumference of the shank; said flange having a rear wall also circumscribing a major portion of the external circumference of the shank and lying in a substantially common diametric plane, said flange having an outside diameter greater than the inside diameter of the seal end wall opening; said shank adjacent to and rearwardly of the flange having an outside diameter less than the outside diameter of the flange; said flange having a gap interrupting its continuity; a leading edge situated on one side of the gap and forming one terminus of the flange, said leading edge being substantially rigid and non-expansible and said leading edge being of progressively diminishing radial dimension and terminating at a point radially closer to the axis of the shank than the radial dimension of the seal end wall opening and said leading edge being diverted from the plane of the flange forwardly at an acute angle inclined from the plane of the flange, the gap in the flange establishing communication between the front side of the flange and the diametrically reduced area on the shank which is rearwardly of the flange, whereby axial and rotative pressure on the shank will cause the leading edge to break the seal end wall at the marginal edge of the opening and rotation of the shank will feed the circumferential marginal edge of the seal end wall onto the diametrically reduced portion of the shank which is situated rearwardly of the flange, the rear wall of the flange contacting the circumferential marginal edge of the seal end wall.

2. A tool for removing a seal having an end wall with an opening therein, said tool comprising a hollow and substantially non-expansible shank; a rigid flange circumscribing a major portion of the external circumference of the shank; said flange having a rear wall also circumscribing a major portion of the external circumference of the shank and lying in a substantially common diametric plane, said flange having an outside diameter greater than the inside diameter of the seal end wall opening; said shank adjacent to and rearwardly of the flange having an outside diameter less than the outside diameter of the flange; said flange having a gap formed therein to establish communication between the forward side of the flange and the diametrically reduced portion of the shank on the rearward side of the flange, said gap defining a path which is diverted forwardly from the diametric plane of the flange and a radially progressively diminishing rigid and non-expansible leading edge forming a continuation of the flange and defining the forward wall of the gap, said leading edge terminating at a point radially closer to the axis of the shank than the radial dimension of the end wall opening, whereby axial and rotative pressure on the shank will cause the leading edge to break the seal end wall at the marginal edge of the opening and rotation of the shank will feed the circumferential marginal edge of the seal end wall onto the diametrically reduced portion of the shank which is situated rearwardly of the flange, the rear wall of the flange contacting the circumferential marginal edge of the seal end wall.

3. A seal removing tool as set forth in claim 1 wherein the shank has an annular shoulder spaced from and rearwardly of the rear wall of the flange thereby forming an annular groove in the shank rearwardly of the flange.

4. A tool as set forth in claim 1 wherein means are associated with the shank for engaging the shaft and thereby exerting axial pressure by the shank flange on the seal end wall.

5. A tool for removing a seal having an end wall with a generally circular opening therein, said tool comprising a non-expansible shank having a generally cylindrical bore therein; a continuous rigid and non-expansible flange formed on and circumscribing more than 300 degrees of the external circumference of the shank in a substantially common diametric plane; a generally cylindrical outer wall surface on the shank rearwardly of the flange and having an outside diameter less than the diameter of the flange; said flange having a gap interrupting its continuity; said flange having a leading edge on one side of the gap and said leading edge being diverted forwardly from the plane of the flange at an angle acute with reference to the flange plane, said leading edge being progressively diminishing in radial dimension and terminating at a point radially closer to the axis of the shank than the radial dimension of the seal end wall opening; a ramp occupying the gap in the flange and located rearwardly of the leading edge so as to communicate with the outer wall surface of the shank behind the flange.

References Cited in the file of this patent

UNITED STATES PATENTS

| | | |
|---|---|---|
| 1,108,059 | Zihler | Aug. 18, 1914 |
| 1,195,220 | Hendren | Aug. 22, 1916 |
| 1,381,101 | Albertson | June 14, 1921 |
| 2,380,068 | Patton | July 10, 1945 |
| 2,618,053 | Claps | Nov. 18, 1952 |
| 2,646,619 | McCord | July 28, 1953 |
| 2,804,887 | Reck | Sept. 3, 1957 |
| 2,867,142 | Hutchins | Jan. 6, 1959 |